Feb. 16, 1943.　　　G. MAURER　　　2,311,451
MORTISING MACHINE
Filed Aug. 25, 1941　　　4 Sheets-Sheet 3
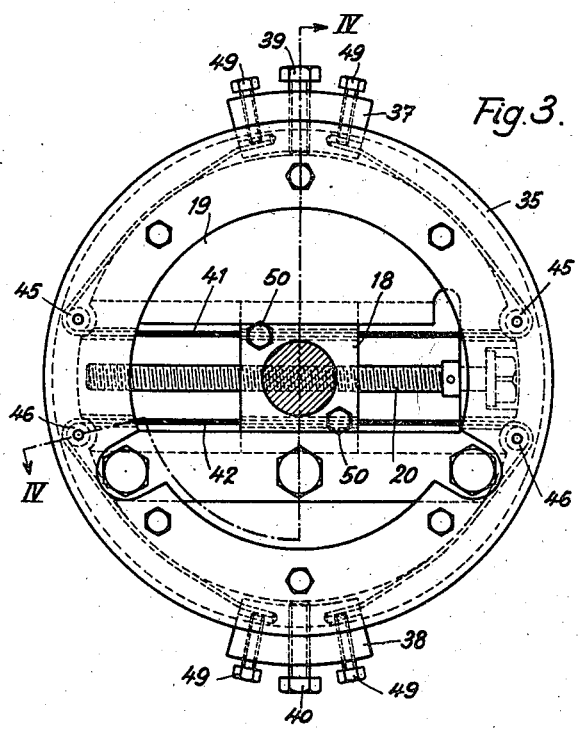
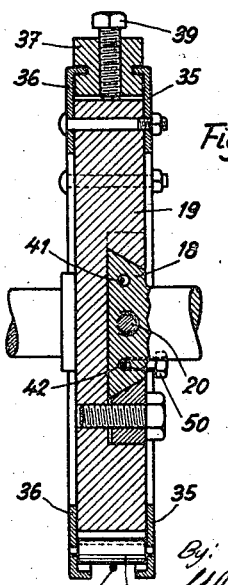

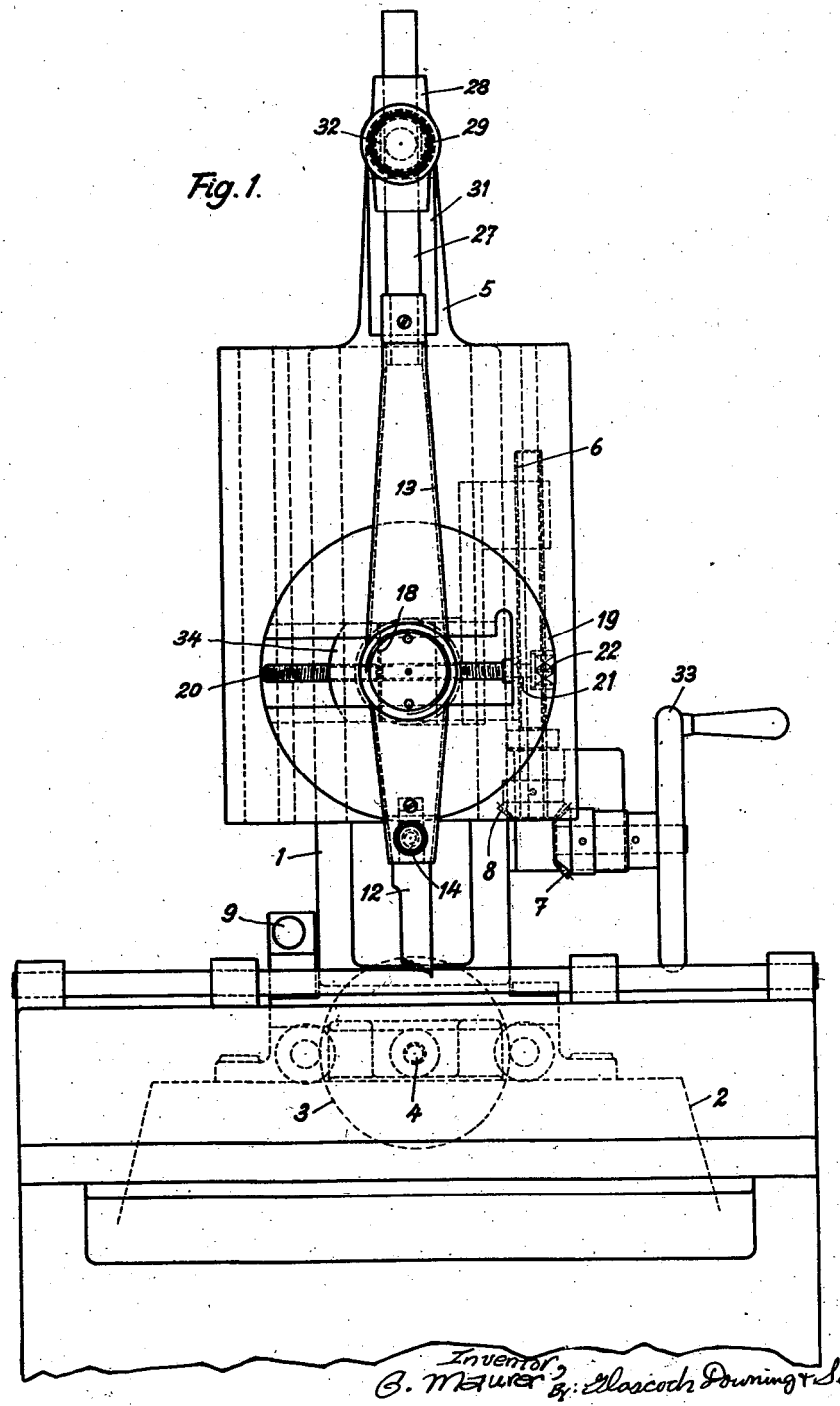

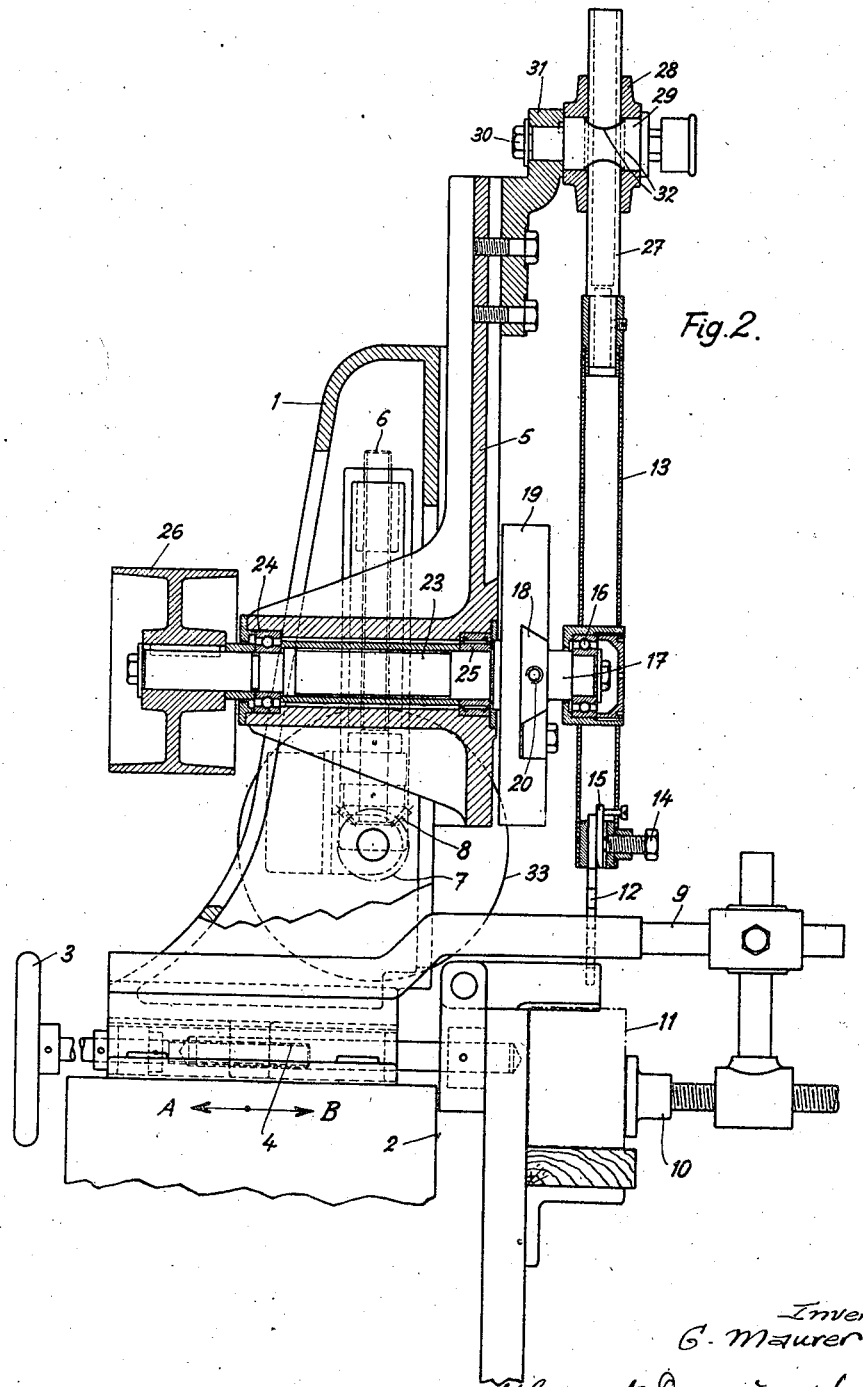

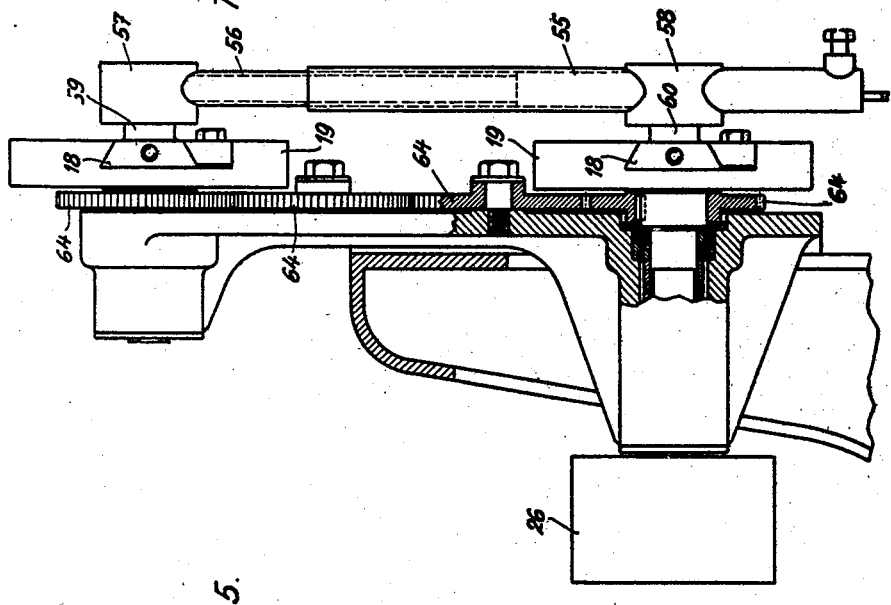
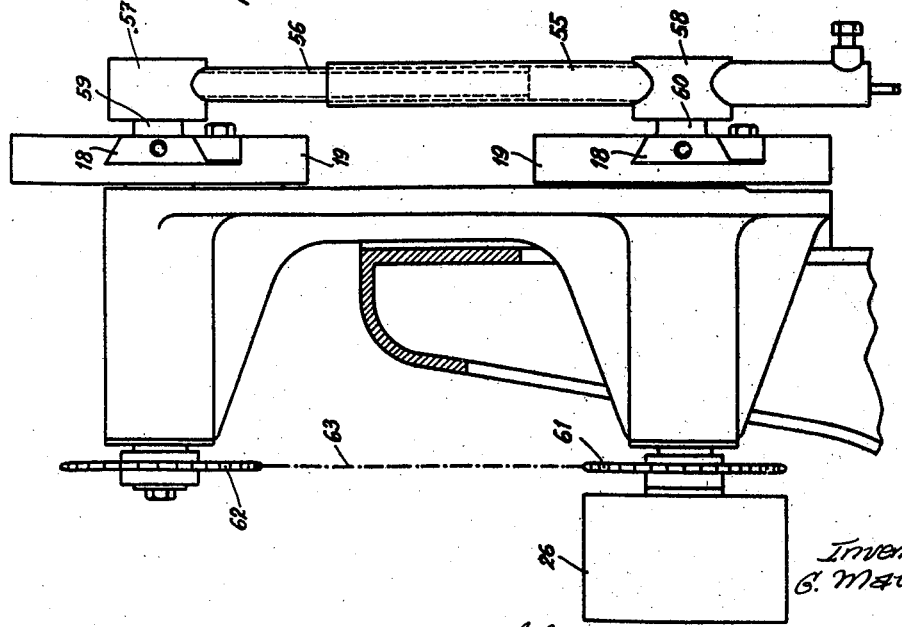

Patented Feb. 16, 1943

2,311,451

UNITED STATES PATENT OFFICE 2,311,451

MORTISING MACHINE

Gottfried Maurer, Zurich, Switzerland, assignor to A. Müller & Cie., Maschinenfabrik und Eisengiesserei, Aktiengesellschaft, Brugg, Switzerland, a joint-stock company of Switzerland Application August 25, 1941, Serial No. 408,265
In Switzerland October 22, 1940

6 Claims. (Cl. 144—80)

The object of the present invention is a mortising machine for chiseling out holes, preferably, but not exclusively, in wooden pieces.

Different kinds of mortising devices are already known.

In one of these known machines mortising is carried out by chains running on a guide, similar to the endless tracks of a tractor. The part of the chain running on the semicircular end of the guide is moved towards the work piece, so that the chain cuts out a hole, whose length is equal to the sum of twice the thickness of the chain plus the width of the guide and whose width is equal to the width of the chain. It may thus be seen that with one chain and its guide only holes of one size can be manufactured. Therefore, as many chains with individual supports are necessary as there are sizes of holes in question. Besides, as is well known, these chains wear out very rapidly. In order to diminish this wearing as much as possible, the chains must be slightly tightened. This however, results in a running out of the chains. Therefore, very exact work is not possible. Added to this, the chains can be used for certain profiles only. When making dovetails, e. g., only square holes can be machined by these chains. The dovetail form must then be given to these square holes by hand. These chain mortisers are very expensive and very delicate with regard to lubrication.

Holes with two opposite semicircular walls were hitherto made by transversally moving a drill, which also did not allow of very exact work.

Holes with a quadratic section had, up to date, to be manufactured with the help of a so-called gouge. Through a central bore of this gouge a drill passes boring a round hole with a diameter equal to the length of the sides of the square in question, whereupon the gouge removes the remaining material in the corners.

Therefore, there exist a multitude of devices which, in part, are very expensive and with the aid of which it is, moreover, not possible to make holes of any desirable profile without hand working.

The present invention relates to a mortising machine which replaces all the above-named devices, avoids any manual labour, allows any hole profile whatever to be machined with the greatest precision and in which the expelling of the shavings is ensured.

It is characterised by an oscillating carrier for the mortise tool.

Preferably this carrier moves the tool along a closed curve.

As the tools are exchangeably fixed to the carrier, only one carrier is necessary for the various profiles. Thus, a whole group of tool carriers must not be provided, as is the case in the chain mortiser.

Other objects and features will be apparent as the following description proceeds, reference being to the accompanying drawings, in which Fig. 1 is a side view of a first embodiment, Fig. 2 is a front view of this first embodiment, partly in section, Fig. 3 shows a detail of a second embodiment and Fig. 4 is a section taken on line IV—IV of Fig. 3.

Fig. 5 is a front view of a third embodiment and

Fig. 6 of a fourth embodiment.

The column 1 is supported on the table 2 of the machine and may be moved in the direction of the arrows A, B (Fig. 2) by means of the hand wheel 3 and the threaded spindle 4. On this column 1 the support 5 is mounted slidably in a vertical direction. This support 5 is displaced by means of a threaded spindle 6 carried by the column 1 and driven with the aid of a hand wheel 33 and the bevel gears 7, 8.

To the arm 9 fixed to the table 2 a clamp 10 is slidably attached for clamping the work piece 11.

The mortise tool 12, which has to cut holes into the work piece 11, is fixed to a swinging carrier 13 by means of the screw 14 and the intermediate layer 15. This carrier 13 is rotatably mounted on the pivot 17 by means of the ball bearing 16. This pivot 17 is placed on a slide 18 engaging a guide of the disc 19. For moving the slide 18 along the guide a threaded spindle 20 is provided, being rotatably supported in the portion 21 of the disc 19 and, in order to be rotated, having a square head 22 at the one end. This spindle 20 engages an inside thread of the slide 18. The disc 19 is fixed to the shaft 23 resting on the bearings 24, 25 of the support 5 and being driven by the belt pulley 26.

In order to diminish the inertia mass the carrier 13 is formed as a hollow body, e. g., of light metal. At the end opposite the tool 12 it is prolonged by a rod 27. This, for the same reasons as the carrier 13, is preferably hollow. This rod can reciprocate in a slide bearing 28. To follow the oscillation of the carrier 13 the bearing is pivotally mounted on the drum 29 fixed to the bracket 31 by means of the bolt 30, which bracket, in its turn, is screwed to the support 5. The rod 27 passes through the bore 32 of the non-rotatable drum 29. Therefore, the bore 32 must be so much larger than the diameter of the rod 27, that, even in the case of the greatest amplitudes of the oscillations, the latter is not hindered by the wall of the bore.

The manner of action of the machine is as follows:

Be it supposed that the slide 18, by means of the spindle 20, has been displaced with regard to the position shown in Fig. 1 in such a way that the axis of the pivot 17, i. e. the axis of oscillation of the tool carrier 13, lies outside the axis of rotation of the disc 19, so that there is an eccentricity between the two axes. Then, when the disc 19 rotates, the tool 12 describes an ellipse, that is, a closed curve. If a feed motion is given to the tool 12 by means of the hand wheel 33, the tool will cut a mortise in the work piece. By changing the above eccentricity with the help of the spindle 20 the length of the mortise can be varied as desired. If the width of the hole is to be altered, a tool of corresponding thickness can be inserted in a simple manner. If it is desired to give the mortise a special profile, e. g. a dove-tailed profile, a correspondingly shaped tool may be chosen. Thus, it is not necessary first to cut a square hole and, afterwards, to finish the dovetail by hand, as was hitherto done. The dovetail can be completely machined in a single operation. Mortises whose smaller sides are semicircular, may be machined by a semicircularly profiled tool in a single operation. Thus the tedious manufacture of such mortises by transversally moving a drill is avoided. Quadratic holes may also be made by the machine according to the invention. In this case the tool has a thickness equal to the length of the sides of the square and a width smaller than this length. Thus, also the expensive gouges for quadratic mortises are avoided.

The eccentric position of the slide 18 requires a balancing of the masses. In the example shown in Fig. 1 this is obtained by a counterbalance weight 34 placed in the same guide of the disc 19 on which the slide 18 is slidably mounted. This weight comprises an inside thread engaging a second thread of the spindle 20. If the thread cooperating with the slide 18 is a right-handed one, the thread engaging the weight 34 is a left-handed thread or vice versa. If, therefore, the slide 18, seen in Fig. 1, moves to the right, the weight 34 goes to the left, or vice versa. In case the slide 18 is in its central position the weight 34 is in its innermost position. It is a matter of course that the weight 34 must be so great as to balance in the best possible way the displacement of the masses at any eccentricity of the slide.

Figures 3 and 4 show another manner of balancing the masses. The rings 35, 36 fixed to both sides of the disc 19 (Fig. 4) form a guide for the counterbalance weights 37, 38. These latter may thus be moved along the circumference of the disc 19. In an adjusted position they are clamped fast by means of the screws 39, 40. Besides, these counterbalance weights 37, 38 are connected with the slide 18 by means of wire cables 41, 42 or other flexible means running on rollers 45, 46. These wires cables are fastened to the slide and to the counterbalance weights by means of screws 49 and 50. The rollers 45 and 46 are mounted on the rings 35, 36, as is shown in Fig. 4 for a roller 46. When the slide 18 is moved by the spindle 20, the weights 37, 38, as may be seen from Fig. 3, are displaced so much in a direction opposite to that of the motion of the slide, as may be necessary for balancing the masses. The cables 41 and 42 may be omitted. In this case, each weight 37, 38 is individually displaced by hand and preferably an index mark is provided on the disc 19 for each position of the weights 37, 38 corresponding to the actual slide position.

Instead of guiding the oscillating carrier at the top in a slide bearing, it can even at the top be attached to a rotatable disc. Then the arm must be telescopic. Figures 5 and 6 illustrate two embodiments of this kind:

The oscillating carrier comprises two parts 55, 56, telescopically engaging each other. These parts are attached to the hubs 57, 58 pivotally mounted on the slides 18 by means of the pins 59, 60. As in the previous embodiments, these slides 18 are slidably placed on guides of the discs 19. These discs 19 and the slides 18 as well as the mounting of the hubs 57, 58 may be the same as shown in Figs. 1 and 2. In case the discs revolve in the same direction (Fig. 5), the upper disc can be driven by the shaft of the lower one with the help of the chain wheels 61, 62 and the chain 63. In case of the discs rotating in opposite direction (Fig. 6), the upper discs can be driven by the shaft of the lower one with the aid of the gear wheels 64.

By this manner of mounting the oscillating carrier on two rotatable discs special possibilities for varying the curves described by the tool are obtained. In this way, it is, e. g., possible to get curves of large radii.

While these embodiments of the invention have been illustrated and described in such detail as to enable any one skilled in the art to practise the invention, nevertheless it is to be understood that the invention is not to be limited to any of the details disclosed, but, instead, it will be understood that the invention embraces such embodiments of the broad idea as fall within the scope of the subjoined claims, it being obvious that various changes may be made without departing from the spirit of the invention.

What I claim is:

1. In a mortising machine, a support, a first bearing movably arranged on said support, a rotatable disc pivotally mounted on said support, a slide slidably mounted on said rotatable disc, a second bearing attached to said slide, an oscillating tool carrier mounted on said first and on said second bearing, and a threaded spindle adapted to cooperate with said slide for changing the distance between said second bearing and the axis of rotation of said rotatable disc.

2. In a mortising machine, a support, a swinging bearing on said support, a rotatable disc pivotally mounted on said support, a slide slidably mounted on said rotatable disc, a second bearing attached to said slide, an oscillating tool carrier mounted on said swinging bearing and on said second bearing, and a threaded spindle adapted to cooperate with said slide for changing the distance between said second bearing and the axis of rotation of said rotatable disc.

3. In a mortising machine, a support, an immovable drum fastened to said support, a swinging bearing on said drum, a rotatable disc pivotally mounted on said support, a slide slidably mounted on said rotatable disc, a second bearing attached to said slide, an oscillating tool carrier mounted on said swinging bearing and on said second bearing and passing through said drum, and a threaded spindle adapted to cooperate with said slide for changing the distance between said second bearing and the axis of rotation of said rotatable disc.

4. In a mortising machine, a support, a swinging bearing on said support, a rotatable disc pivotally mounted on said support, a slide slidably mounted on said rotatable disc, a second bearing attached to said slide, a hollow oscillating tool carrier of light metal mounted on said swinging bearing and on said second bearing, and a threaded spindle adapted to cooperate with said slide for changing the distance between said second bearing and the axis of rotation of said rotatable disc.

5. In a mortising machine, a support, two rotatable discs pivotally mounted on said support, two slides mounted on said rotatable discs, two bearings attached to said slides, an oscillating tool carrier mounted on said bearings, and two threaded spindles adapted to cooperate with said slides for changing the distance between said bearings and the axes of rotation of said rotatable discs.

6. In a mortising machine, a support, two rotatable discs pivotally mounted on said support, two slides mounted on said rotatable discs, two bearings attached to said slides, an oscillating telescopically formed tool carrier mounted on said bearings, and two threaded spindles adapted to cooperate with said slides for changing the distance between said bearings and the axes of rotation of said rotatable discs.

GOTTFRIED MAURER.